United States Patent
Daido et al.

(10) Patent No.: US 12,477,190 B2
(45) Date of Patent: Nov. 18, 2025

(54) DISTRIBUTION SYSTEM, DISTRIBUTION METHOD, AND NON-TRANSITORY COMPUTER-READABLE RECORDING MEDIUM

(71) Applicant: YAMAHA CORPORATION, Hamamatsu (JP)

(72) Inventors: Ryunosuke Daido, Hamamatsu (JP); Takashi Mori, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 48 days.

(21) Appl. No.: 18/474,371

(22) Filed: Sep. 26, 2023

(65) Prior Publication Data
US 2024/0015368 A1    Jan. 11, 2024

Related U.S. Application Data

(63) Continuation of application No. PCT/JP2021/013283, filed on Mar. 29, 2021.

(51) Int. Cl.
*H04N 21/81*    (2011.01)
*H04N 21/442*    (2011.01)

(52) U.S. Cl.
CPC ... *H04N 21/8106* (2013.01); *H04N 21/44213* (2013.01)

(58) Field of Classification Search
None
See application file for complete search history.

(56) References Cited

U.S. PATENT DOCUMENTS

| | | | |
|---|---|---|---|
| 2008/0071399 A1* | 3/2008 | Baird | H04H 60/80 700/94 |
| 2017/0264954 A1* | 9/2017 | Nakagawa | H04N 21/44008 |
| 2023/0156124 A1* | 5/2023 | Li | H04L 12/1818 709/204 |

FOREIGN PATENT DOCUMENTS

| | | | |
|---|---|---|---|
| JP | A2008131379 | | 6/2008 |
| JP | 2009182410 A | * | 8/2009 |

* cited by examiner

*Primary Examiner* — Junior O Mendoza
(74) *Attorney, Agent, or Firm* — CHIP LAW GROUP (57) ABSTRACT

A distribution system includes an obtaining circuit, a determination circuit, a generation circuit, and a distribution circuit. The obtaining circuit obtains reaction information from a terminal device of a viewer of the content. The reaction information indicates a reaction of the viewer to the content. The determination circuit determines whether the reaction information is first reaction information or second reaction information. The first reaction information indicates a first reaction made by equal to or more than a predetermined number of viewers. The second reaction information is different from the first reaction information and indicates a second reaction made by less than the predetermined number of viewers. The generation circuit generates an audience sound in a case of the first reaction information. The distribution circuit transmits the audience sound to the plurality of terminal devices.

20 Claims, 5 Drawing Sheets

| Viewer number | Attribute | ... |
|---|---|---|
| 1 | ... | ... |
| 2 | ... | ... |
| ... | ... | ... |

| Viewer number | Performance | Audience sound | Second reaction information | ... |
|---|---|---|---|---|
| 1 | ... | ... | ... | ... |
| 2 | ... | ... | ... | ... |
| ... | ... | ... | ... | ... |

DISTRIBUTION SYSTEM, DISTRIBUTION METHOD, AND NON-TRANSITORY COMPUTER-READABLE RECORDING MEDIUM

CROSS-REFERENCE TO RELATED APPLICATIONS

The present application is a continuation application of International Application No. PCT/JP2021/013283, filed Mar. 29, 2021. The contents of this applications are incorporated herein by reference in their entirety.

BACKGROUND

Field

The present disclosure relates to a distribution system, a distribution method, and a non-transitory computer-readable recording medium.

Background Art

JP 2008-131379 A discloses a system that distributes, live, a moving image of singing performance and/or musical performance. In this system, the singer(s) and musical performer(s) perform at different places. At each of the places, a camera is set. A control center synthesizes moving images obtained from the cameras to generate a distribution moving image, and distributes the distribution moving image to receiving terminals.

Some viewers wonder how to enjoy the piece of music being performed and like to see how other viewers are enjoying the piece of music. That is, it is preferable that the viewers' reactions to live distributions can be shared.

The present disclosure has been made in view of the above-described and other circumstances, and has an object to share viewers' reactions to a live distribution.

SUMMARY

One aspect is a distribution system includes an obtaining circuit, a determination circuit, a generation circuit, and a distribution circuit. The obtaining circuit is configured to obtain reaction information from a terminal device of a viewer of the content. The reaction information indicates a reaction of the viewer to the content. The determination circuit is configured to determine whether the reaction information is first reaction information or second reaction information. The first reaction information indicates a first reaction made by equal to or more than a predetermined number of viewers. The second reaction information is different from the first reaction information and indicates a second reaction made by less than the predetermined number of viewers. The generation circuit is configured to generate an audience sound in a case where the reaction information is as the first reaction information. The distribution circuit is configured to transmit the audience sound generated by the generation circuit to a plurality of terminal devices.

Another aspect is a distribution method performed by a computer used in a distribution system. The distribution method includes obtaining reaction information from a terminal device of a viewer of the content. The reaction information indicates a reaction of the viewer to the content. The distribution method also includes determining whether the reaction information is first reaction information or second reaction information. The first reaction information indicates a first reaction made by equal to or more than a predetermined number of viewers. The second reaction information is different from the first reaction information and indicates a second reaction made by less than the predetermined number of viewers. The distribution method also includes generating an audience sound in a case where the reaction information is determined as the first reaction information. The distribution method also includes transmitting the audience sound to a plurality of terminal devices.

Another aspect is a non-transitory computer-readable recording medium that stores a program executed by at least one computer used in a distribution. The program causes the at least one computer to perform a method including obtaining reaction information from a terminal device of a viewer of the content. The reaction information indicates a reaction of the viewer to the content. The method also includes determining whether the reaction information is first reaction information or second reaction information. The first reaction information indicates a first reaction made by equal to or more than a predetermined number of viewers. The second reaction information is different from the first reaction information and indicates a second reaction made by less than the predetermined number of viewers. The method also includes generating an audience sound in a case where the reaction information is determined as the first reaction information. The method also includes transmitting the audience sound to a plurality of terminal devices.

BRIEF DESCRIPTION OF THE DRAWINGS

A more complete appreciation of the present disclosure and many of the attendant advantages thereof will be readily obtained as the same becomes better understood by reference to the following detailed description when considered in connection with the following figures.

DESCRIPTION OF THE EMBODIMENTS

The present development is applicable to a distribution system, a distribution method, and a non-transitory computer-readable recording medium.

The distribution system 1 according to the embodiment will be described by referring to the accompanying drawings. The following description is an example in which the distribution system 1 distributes images and/or sound associated with a live performance. This example, however, is not intended in a limiting sense; the distribution system 1 according to the embodiment is applicable to any other content distribution.

Figure 1:
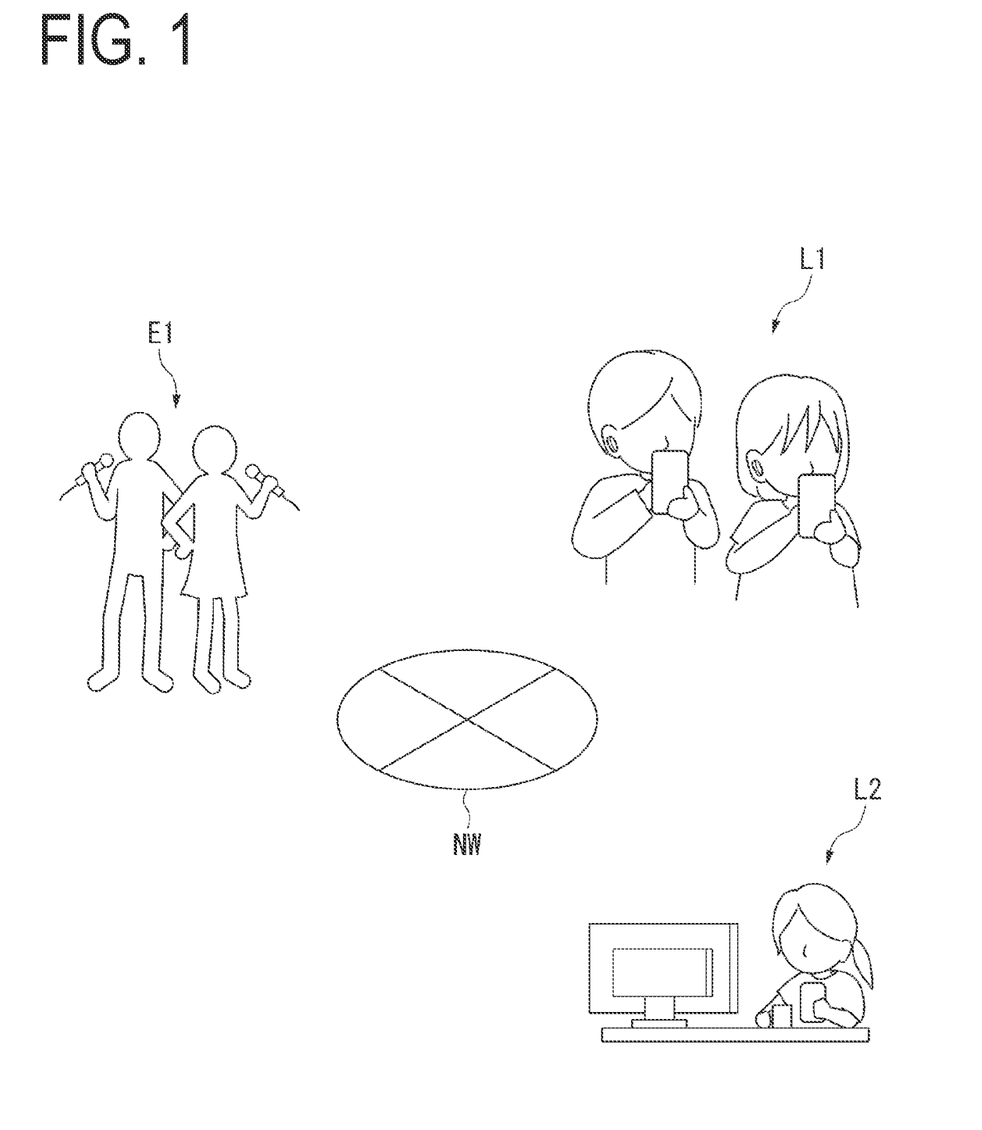
FIG. 1 schematically illustrates a distribution system 1 according to an embodiment.

FIG. 1 schematically illustrates the distribution system 1 according to the embodiment. The distribution system 1 is a system that distributes, in real-time, a live performance performed by a performer(s) to a plurality of viewers. As illustrated in FIG. 1, in the distribution system 1, moving images and/or sound associated with a musical performance performed by performers E1 are distributed to viewers L1 and L2 through a communication network NW. The viewers L1 and L2 view the musical performance using, for example, a smartphone, a portable terminal, a tablet, or a PC (Personal Computer).

The distribution system 1 also distributes information indicating viewers' reactions (reaction information), as well as live performances. The reaction information indicates viewers' reactions to the distributed live performance. Examples of the reactions include voice such as of cheering and calling out; and sound such as of hand clapping. Alternatively, the reaction information may be text data representing viewers' impressions and supportive comments. Such text data is obtained by operating a keyboard or a similar input device. The reaction information may also be viewers' motions obtained by a motion sensor or a gyro sensor incorporated in a smartphone.

The distribution system 1 generates an audience sound based on the reaction information. As used herein, the term "audience sound" is intended to mean a sound indicating a reaction(s) of audience consisting of a crowd of people. For example, an audience sound is a sound made by unifying reactions of individual viewers.

For example, in a live house, there may be a case where a performer tries to charge up the audience in the venue by pointing the performer's microphone toward the audience to prompt the audience to sing the piece of music together. The following description discusses how to realize such performance in a system that distributes a live performance. For example, if individual viewers' voices are distributed to each viewer of the other viewers (as in online meetings), the each viewer is made to hear the individual viewers' voices at a time. This makes it difficult for the viewers to have feelings such as a feeling of being in an actual live house and a feeling of unity.

As a measure against this difficulty, the distribution system 1 generates an audience sound by unifying reactions from individual viewers. For example, the audience sound is made by adding together sounds that are based on individual pieces of reaction information, subjecting the resulting sound to volume adjustment, and subjecting the volume-adjusted sound to acoustic processing such as a reverberation (reverb). This ensures that individual viewers' singing voices responding to the performance of pointing the microphone toward the audience are mixed together on a 100-people or 1000-people basis, resulting in a chorus-like sound. A reverb adds an echo effect to the chorus-like sound, giving the viewers a feeling of being in a hall. Thus, by distributing an audience sound, the viewers are able to have feelings such as a feeling of being in an actual live house and a feeling of unity.

In the distribution system 1, the reaction information is classified into first reaction information and second reaction information. The first reaction information is information indicating reactions from equal to or more than a predetermined number of viewers. For example, the first reaction information is information indicating that equal to or more than a predetermined number of viewers are making similar reactions approximately simultaneously. The first reaction information is used to generate an audience sound. The second reaction information is reaction information different from the first reaction information and indicates reactions from less than the predetermined number of viewers.

The first reaction information is information indicating a reaction from viewers obtained at a predetermined timing in a live performance. For example, the first reaction information is a response to a call from a performer. More specifically, in a case where a call from a performer is "Can you guys on the far side hear me?", a response from equal to or more than the predetermined number of viewers may be a voice saying "Yes, I can hear you!", a motion of raising an arm, a motion of jumping, or a text that reads "Yes, I can hear you!". These response examples represent the first reaction information. It is to be noted that the predetermined number of viewers is intended to mean a majority of all viewers in the embodiment. This, however, is not intended in a limiting sense; any other number is possible. For example, the predetermined number may be a quarter of all viewers.

The second reaction information is information indicating a reaction different from the reaction indicated by the first reaction information. An example of the second reaction information is information unique to a local region. More specifically, in a windy local region, an impression may be "This song strangely complements a windy day like today." This kind of impression is a reaction limited to this local region and, as such, is regarded as second reaction information, which is not an audience sound.

There may be a group of viewers who share a hobby or a goal through viewing of a distributed performance. In this case, the second reaction information is information regarding the hobby or the goal shared in the group. For example, there may be a case where some viewers form a group to deal with a lack of exercise through listening to a distributed live performance. The viewers who belong to the group report to each other how many exercises (for example, sit-ups) they have done during the live performance. This kind of reporting is a reaction limited to this group and, as such, is regarded as second reaction information, which is not an audience sound.

The distribution system 1 distributes the audience sound generated based on the first reaction information to all the viewers. By distributing the audience sound to the viewers, the distribution system 1 enables the viewers to have feelings such as a feeling of being in an actual live performance and a feeling of unity. That is, the distribution system 1 responds to the viewers' expectations such as to enjoy a live performance with a feeling of being in an actual venue.

In contrast, the distribution system 1 distributes the second reaction information only to some viewers. For example, in a case where the distribution system 1 has obtained from a viewer a reaction unique to a local region, the distribution system 1 distributes the reaction information regarding this reaction only to those viewers in the local region. In another case where the distribution system 1 has obtained, from a viewer who belongs to a particular group, reaction information regarding a hobby or a goal shared in the group, the distribution system 1 distributes this reaction information only to the other viewers who belong to the group. Thus, the distribution system 1 distributes a local topic or a common hobby or goal only to those viewers who appreciate the distributed information, making the interaction between the viewers more active. In other words, the distribution system 1 responds to expectations of viewers who want to interact in an intimate manner with other viewers through viewing of a live performance.

Figure 2:
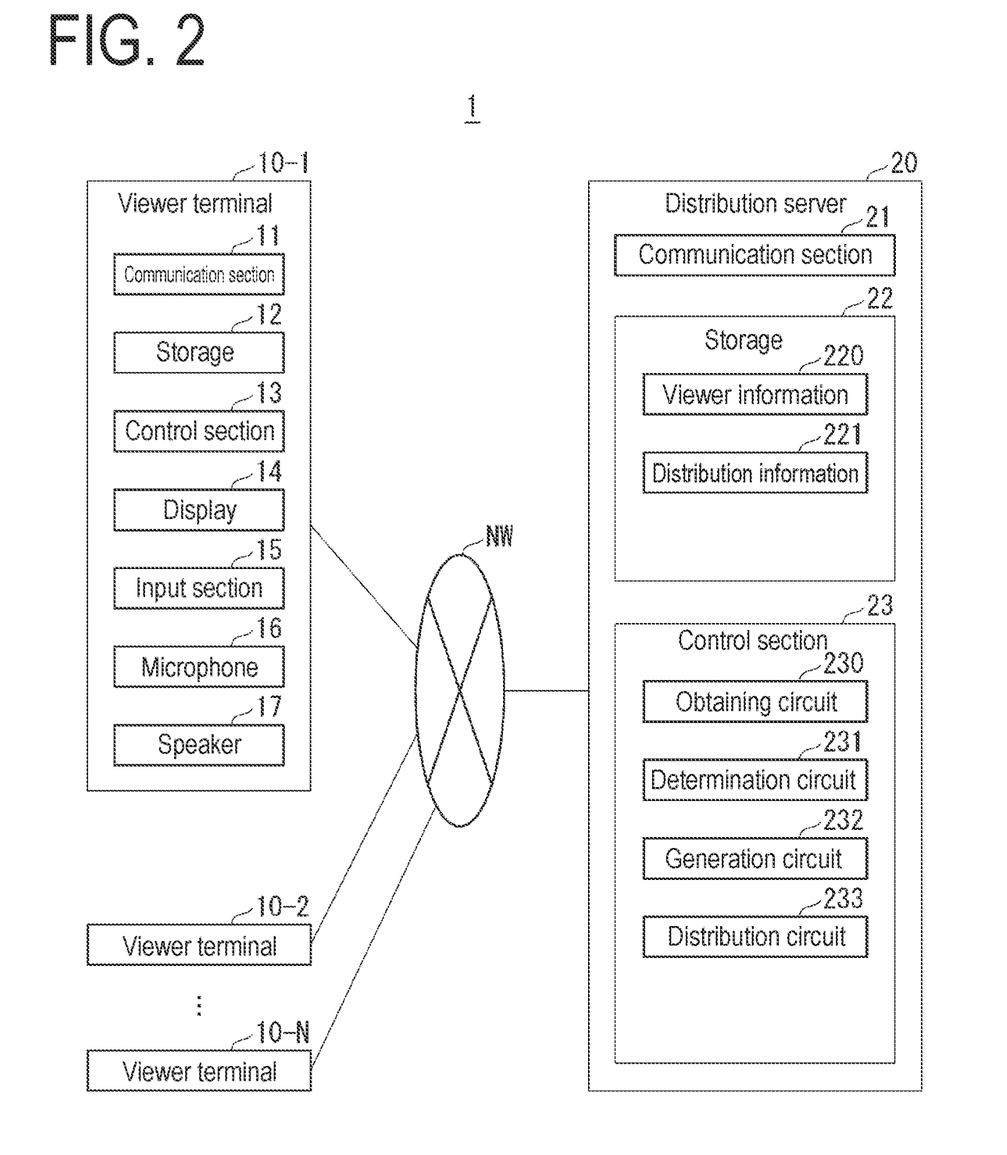
FIG. 2 is a block diagram illustrating an example configuration of the distribution system 1 according to the embodiment.

FIG. 2 is a block diagram illustrating an example configuration of the distribution system 1 according to the embodiment. The distribution system 1 includes, for example, a plurality of viewer terminals 10 (10-1 to 10-N;

N can be any natural number) and a distribution server 20. In the distribution system 1, each viewer terminal 10 of the viewer terminals 10 is communicatively connected to the distribution server 20 through the communication network NW. An example of the communication network NW is a wide area communication network, such as a WAN (Wide Area Network) and the Internet. The communication network NW may also be a combination of a WAN and the Internet.

The each viewer terminal 10 is a computer of a viewer. Examples of the each viewer terminal 10 include a smartphone, a PC, and a tablet terminal. The each viewer terminal 10 includes, for example, a communication section 11, a storage 12, a control section 13, a display 14, an input section 15, a microphone 16, and a speaker 17.

The communication section 11 communicates with the distribution server 20. The storage 12 is implemented by a storage medium such as an HDD, a flash memory, an EEPROM (Electrically Erasable Programmable Read Only Memory), a RAM (Random Access read/write Memory), a ROM (Read Only Memory), or a combination of the foregoing. The storage 12 stores programs executed to perform various kinds of processing in the viewer terminal 10, and stores temporary data used when various kinds of processing are performed.

The control section 13 is implemented by a program executed by a CPU (Central Processing Unit) provided in the viewer terminal 10 in the form of hardware. The control section 13 integrally controls the viewer terminal 10. Specifically, the control section 13 controls the communication section 11, the storage 12, the display 14, the input section 15, the microphone 16, and the speaker 17.

The display 14 includes a display device such as a liquid-crystal display, and is controlled by the control section 13 to display images such as a moving image of a live performance.

The input section 15 is a function section into which reaction information other than sound is input. Examples of the input section 15 include a mouse, a keyboard, a touch panel, a track ball, and a game console. Upon operation of a keyboard or a similar input device by the viewer, the input section 15 obtains information indicating the operation. The input section 15 outputs the obtained information to the control section 13.

The microphone 16 acquires sound such as the viewer's voice and hand clapping sound. The sound acquired by the microphone 16 during a live distribution becomes the viewer's reaction information. The microphone 16 acquires the viewer's sound such as voice, and outputs the acquired sound to the control section 13.

The speaker 17 is controlled by the control section 13 to output sound. The sound output from the speaker 17 includes audience sound and performance sound made by a performer(s) in a live performance. The speaker 17 may be a speaker having a plurality of sound outputting sections, such as a two-channel stereo speaker and a three or more-channel surround speaker. Outputting sounds of a plurality of channels provides a sense of direction, distance, and sound field for the performance sound and audience sound, enabling the viewers to experience a feeling of realism.

The distribution server 20 is a computer that distributes moving images and/or sound associated with a musical performance. Examples of the distribution server 20 include a server, a cloud, and a PC.

The distribution server 20 includes, for example, a communication section 21, a storage 22, and a control section 23. The communication section 21 communicates with the viewer terminals 10. Specifically, the communication section 21 receives reaction information from each viewer terminal 10 of the viewer terminals 10. The communication section 21 outputs the received information to the control section 23. Also, the communication section 21 is controlled by the control section 23 to transmit distribution information to the viewer terminals 10. The distribution information indicates moving images, performance sound, and audience sound associated with a live performance.

The storage 22 is implemented by a storage medium such as an HDD, a flash memory, an EEPROM, a RAM, a ROM, or a combination of the foregoing. The storage 22 stores programs executed to perform various kinds of processing in the distribution server 20, and stores temporary data used when various kinds of processing are performed. The storage 22 stores, for example, the viewer information 220 and the distribution information 221.

Figure 3:
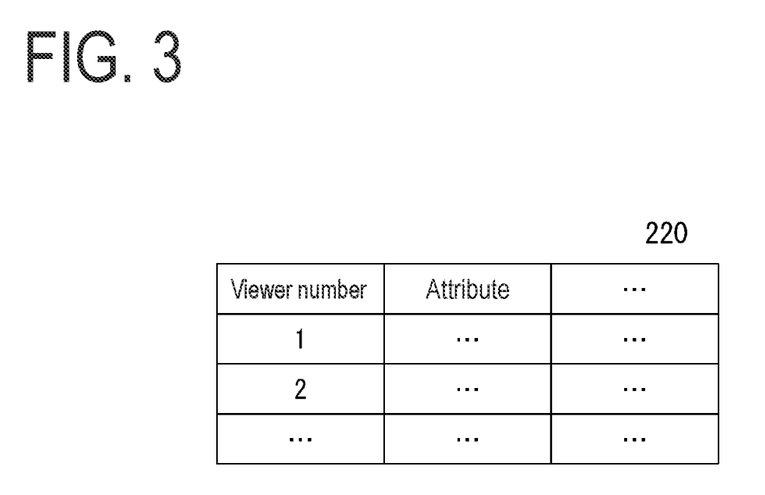
FIG. 3 illustrates an example of viewer information 220 according to the embodiment.

The viewer information 220 will be described by referring to FIG. 3. The viewer information 220 is information regarding a viewer. FIG. 3 illustrates an example of the viewer information 220 according to the embodiment. As illustrated in FIG. 3, the viewer information 220 includes, for example, items such as Viewer number and Attribute. Viewer number is identification information, such as number, for uniquely identifying a viewer. Attribute is information indicating an attribute of the viewer identified by Viewer number. For example, an attribute of a viewer is information indicating the viewer's full name, gender, and/or age.

The Attribute item included in the viewer information 220 is used as information for determining whether to distribute the second reaction information to the viewer having the attribute. Based on the Attribute item included in the viewer information 220, the distribution system 1 determines to which viewer the second reaction information should be distributed. This will be described in detail later.

Figure 4:
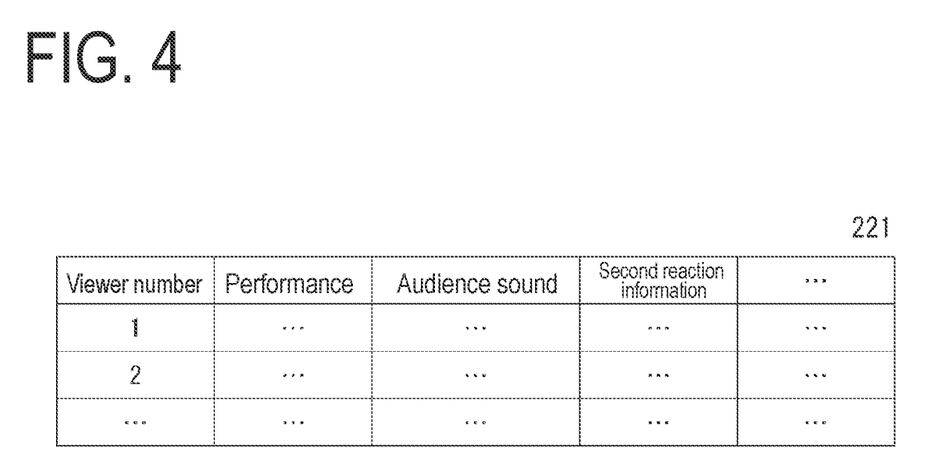
FIG. 4 illustrates an example of distribution information 221 according to the embodiment.

The distribution information 221 will be described by referring to FIG. 4. The distribution information 221 is information regarding content to be distributed to a viewer. FIG. 4 illustrates an example of the distribution information 221 according to the embodiment. As illustrated in FIG. 4, the distribution information 221 includes items such as Viewer number, Performance, Audience sound, and Second reaction information. Viewer number is identification information, such as number, for uniquely identifying a viewer. Performance is information indicating content to be transmitted to the viewer identified by Viewer number. Examples of the content include an moving image and performance sound associated with a live performance. Audience sound is an audience sound to be transmitted to the viewer identified by Viewer number. Second reaction information is second reaction information that is from a viewer other than the viewer identified by Viewer number and that is to be transmitted to the viewer identified by Viewer number.

Referring again to FIG. 2, the control section 23 is implemented by a program executed by a CPU provided in the distribution server 20 in the form of hardware. The control section 23 includes, for example, an obtaining circuit 230, a determination circuit 231, a generation circuit 232, and a distribution circuit 233.

The obtaining circuit 230 obtains reaction information indicating the viewers' reactions. Specifically, the obtaining circuit 230 obtains reaction information that the communication section 21 has received from the viewer terminals 10. Then, the obtaining circuit 230 outputs the obtained reaction information to the determination circuit 231.

The determination circuit 231 obtains the reaction information from the obtaining circuit 230, and determines whether the obtained reaction information is first reaction information or second reaction information. For example, based on a timing at which the reaction information is obtained from a viewer, the determination circuit 231 determines whether the reaction information is first reaction information or second reaction information.

In a case of a response to a call from a performer, a response that a viewer made within a predetermined time (for example, within a few to several seconds) from the performer's call is regarded as first reaction information. In a case where a microphone is pointed toward a viewer, the viewer's singing voice acquired during the time when the microphone is pointed toward the viewer is regarded as first reaction information. As seen from this nature of first reaction information, the determination circuit 231 regards reaction information obtained at a particular timing from a viewer as first reaction information. For example, reaction information obtained from a viewer at a timing of elapse of a predetermined time (for example, within a few to several seconds) from a performer's call is regarded as first reaction information by the determination circuit 231. For further example, reaction information obtained from a viewer at a timing when a microphone is pointed toward the viewer is regarded as first reaction information by the determination circuit 231.

It is to be noted that a timing of a performer's call and a timing at which a microphone is pointed toward a viewer in a live performance may be determined conveniently. For example, based on a recording of live performance rehearsal, the distribution system 1 may identify a timing of a performer's call and a timing at which a microphone is pointed toward a viewer. Then, the distribution system 1 may set in advance a timing(s) at which to receive first reaction information.

There may be a case where the determination circuit 231 obtains pieces of reaction information from a large number of viewers (for example, a number of viewers equal to or greater than a threshold) for a period of time (for example, for a few to several seconds). In this case, the determination circuit 231 may regard the pieces of reaction information obtained from these viewers at a timing of elapse of the period of time as first reaction information. The determination circuit 231 outputs the reaction information determined as first reaction information to the generation circuit 232.

In contrast, such second reaction information as "X district is windy today as usual" and "This performer is from Y district, isn't he/she?" is in many cases generated at a timing deemed convenient by an individual viewer, irrespective of whether the timing is appropriate for the live performance. In view of this nature of second reaction information, the second reaction information is presumably obtained at a timing different from the timing at which the first reaction information is obtained. Accordingly, the determination circuit 231 regards as second reaction information reaction information obtained from a viewer at a timing different from the timing to obtain the first reaction information.

There may be a case where the determination circuit 231 obtains reactions from a small number of viewers (for example, a number of viewers less than the threshold) for a period of time (for example, within a few to several seconds). In this case, the determination circuit 231 may regard each reaction obtained from each viewer at a timing of elapse of the period of time as second reaction information.

Based on the reaction information determined as second reaction information, the determination circuit 231 determines viewers to which the second reaction information is to be distributed. Based on the attribute of the viewer who notified the reaction information determined as second reaction information, the determination circuit 231 determines viewers to which the second reaction information is to be distributed. For example, the determination circuit 231 refers to the viewer information 220 to identify a local region in which the viewer who notified the second reaction information exists. The determination circuit 231 determines that the second reaction information is to be distributed to other viewers who exist in the identified local region.

Alternatively, the determination circuit 231 refers to the viewer information 220 to identify a group to which the viewer who notified the reaction information determined as second reaction information belongs. The determination circuit 231 determines that the second reaction information is to be distributed to other viewers who belong to the identified group.

The determination circuit 231 stores the second reaction information in the distribution information 221 of each viewer who is determined as a distribution destination of the second reaction information.

The generation circuit 232 generates an audience sound based on the first reaction information. The generation circuit 232 generates a sound signal that is based on the first reaction information. For example, in a case where the first reaction information is viewers' voice or sound such as of hand clapping, the generation circuit 232 regards the voice or sound itself as a sound signal. For further example, in a case where the first reaction information is text data, the generation circuit 232 regards a virtual sound reading the text data aloud as a sound signal. For further example, in a case where the first reaction information indicates viewers' motion, the generation circuit 232 regards, as a sound signal, a sound reflecting the motion in the sound's frequency and/or sound volume.

The generation circuit 232 generates an audience sound by, for example, subjecting a plurality of sound signals generated based on the first reaction information to mixing, and subjecting the resulting sound signal to acoustic signal processing such as a reverb. It is to be noted that the generation circuit 232 may perform volume adjustment on the signal before subjecting the signal to acoustic signal processing or after subjecting the signal to acoustic signal processing. The generation circuit 232 stores the generated audience sound in the "Audience sound" item of the distribution information 221 of each viewer to which the second reaction information is distributed.

The distribution circuit 233 distributes content to viewers based on the distribution information 221. The distribution circuit 233 refers to the distribution information 221 to transmit a moving image, a performance sound, and an audience sound to the viewer terminals 10 of all the viewers. The moving image and the performance sound are associated with a live performance. The audience sound is generated by the generation circuit 232. The distribution circuit 233 also refers to the distribution information 221, and in a case where reaction information is stored in a viewer's "Second reaction information" item of the distribution information 221, the distribution circuit 233 transmits the reaction information to the viewer terminal 10 of the viewer. That is, the distribution circuit 233 does not transmit the second reaction information to the viewer terminals of all the viewers; instead, the distribution circuit 233 transmits the second reaction information to the viewer terminal(s) 10 of one or some of the viewers.

Figure 5:
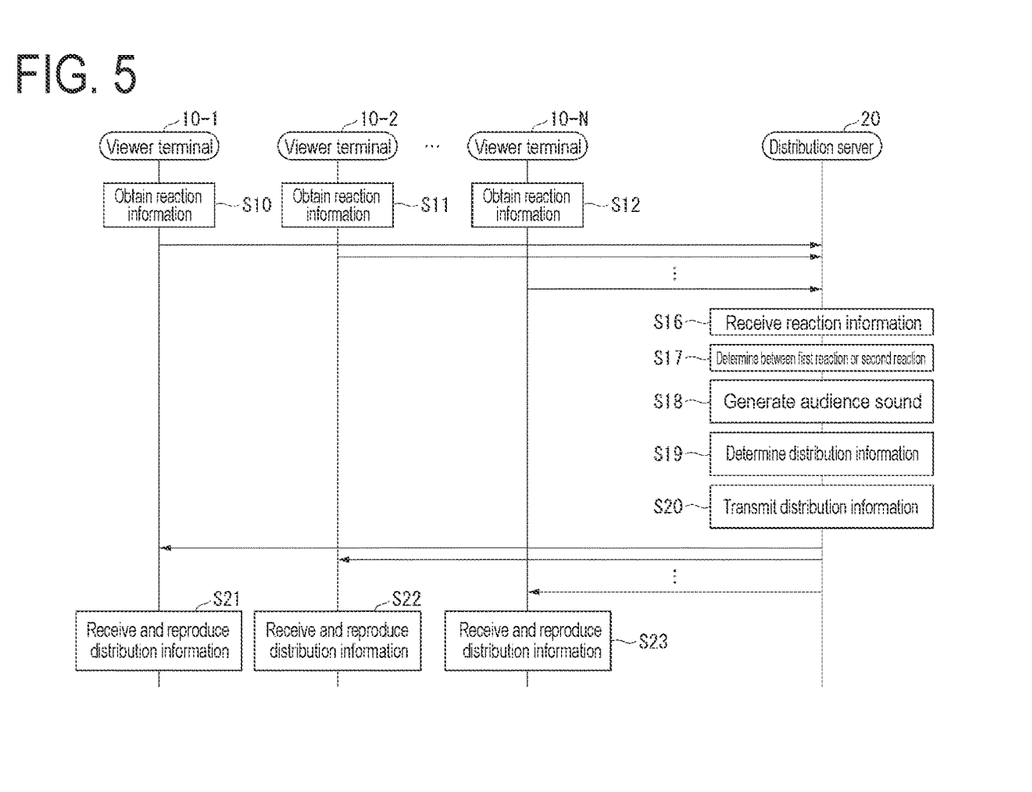
FIG. 5 is a sequence chart showing a flow of processing performed by the distribution system 1 according to the embodiment.

FIG. 5 is a sequence chart showing a flow of processing performed by the distribution system 1 according to the embodiment. The following description assumes that the distribution server 20 is distributing moving images and/or performance sound associated with a live performance to the viewer terminals 10 (the viewer terminals 10-1 to 10-N) of a plurality of viewers and that the plurality of viewers are viewing the distributed live performance via the viewer terminals 10.

Each viewer terminal 10 of the viewer terminals 10 (the viewer terminals 10-1 to 10-N) obtains reaction information indicating the viewer's reaction (steps S10 to S12). Specifically, the each viewer terminal 10 obtains the reaction information by acquiring sound such as the viewer's voice and hand clapping sound. The each viewer terminal 10 also obtains reaction information by obtaining text data that indicates the viewer's comment and that the viewer has input using a keyboard or a similar input device. The each viewer terminal 10 also obtains reaction information by obtaining the viewer's motion detected by, for example, a motion-capture function. Then, the each viewer terminal 10 transmits the obtained reaction information to the distribution server 20.

The distribution server 20 receives reaction information from each viewer terminal 10 of the viewer terminals 10 (step S13). The distribution server 20 determines whether the received reaction information is first reaction information or second reaction information (step S14). For example, the distribution server 20 determines, as first reaction information, reaction information received from the each viewer terminal 10 at a predetermined timing. For example, the distribution server 20 determines, as second reaction information, reaction information received from the each viewer terminal 10 at a timing different from a predetermined timing.

The distribution server 20 generates an audience sound using the reaction information determined as first reaction information (step S15). The distribution server 20 generates a plurality of sound signals based on individual pieces of first reaction information. Then, the distribution server 20 generates an audience sound by subjecting the generated plurality of sound signals to mixing, and subjecting the resulting sound signal to acoustic processing such as a reverb. It is to be noted that the distribution server 20 may perform volume adjustment on the signal before subjecting the signal to acoustic signal processing or after subjecting the signal to acoustic signal processing.

The distribution server 20 determines the distribution information 221 (step S16). The distribution server 20 determines that moving images and/or performance sound associated with a live performance and the audience sound generated at step S15 are to be distributed to all the viewers. The distribution server 20 identifies the attribute of the viewer corresponding to the viewer terminal 10 that has notified the reaction information determined as second reaction information. Examples of the viewer's attribute include the local region in which the viewer exists and a group to which the viewer belongs. The distribution server 20 determines that the second reaction information is to be distributed to other viewers who have the same attribute as the identified attribute of the viewer.

Based on the distribution information 221 determined at step S16, the distribution server 20 transmits, to each viewer terminal 10 of the viewer terminals 10, a different distribution content determined for the each viewer terminal 10 (step S17).

Each viewer terminal 10 of the viewer terminals 10 receives the distribution content transmitted from the distribution server 20, and reproduces the received distribution content (steps S21 to S23). For example, the each viewer terminal 10 displays on the display 14 the moving image(s) associated with the live performance. The each viewer terminal 10 also outputs to the microphone 16 the performance sound associated with the live performance and the audience sound. In a case where second reaction information has been distributed, the each viewer terminal 10 outputs the second reaction information. For example, in a case where the second reaction information is sound, the each viewer terminal 10 outputs the sound to the microphone 16. In a case where the second reaction information is text data, the each viewer terminal 10 displays on the display 14 a comment corresponding to the text data.

Modification of the Embodiment

A modification of the embodiment will be described. The modification is different from the above-described embodiment in (1) Content is distributed through a distributed network, and (2) Second reaction information is distributed to each viewer-terminal-10 group corresponding to a distributed network.

Figure 6:
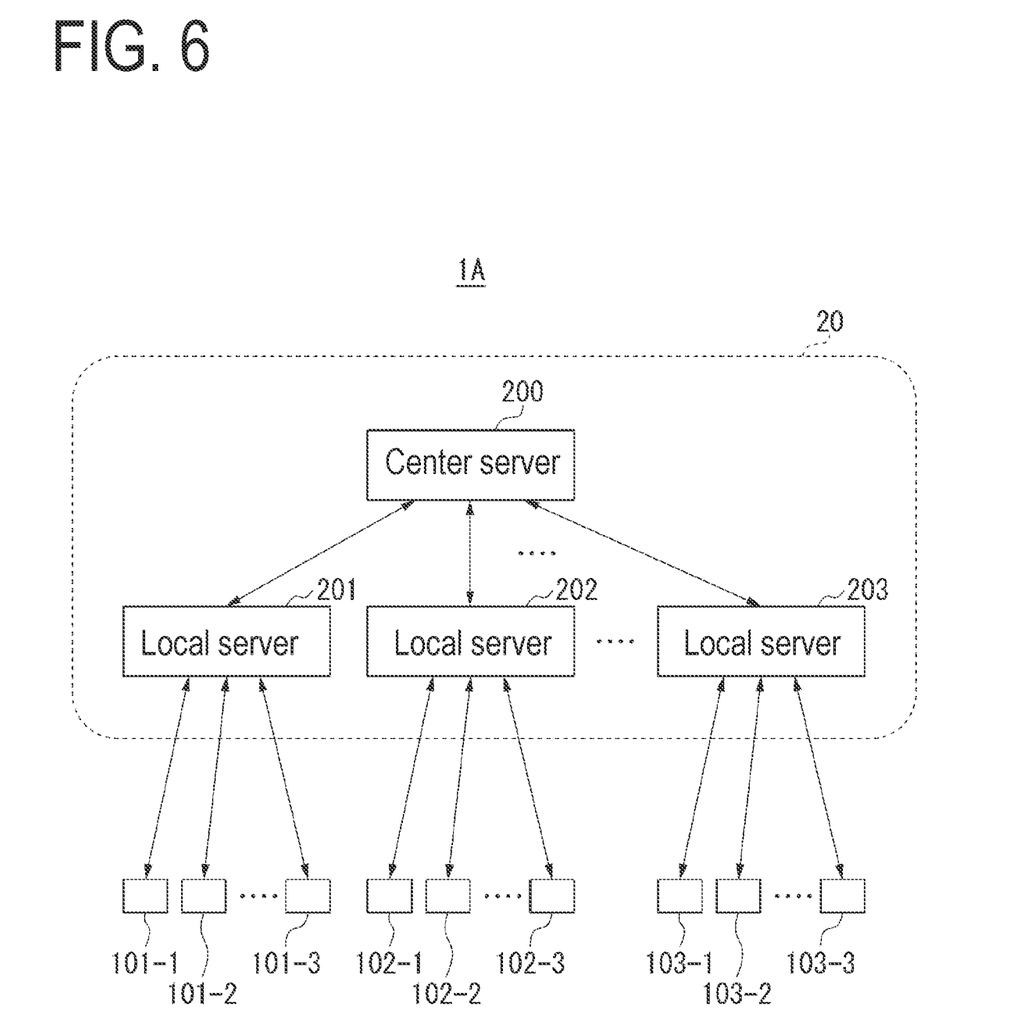
FIG. 6 illustrates a distribution system according to a modification of the embodiment.

FIG. 6 illustrates a distribution system 1A according to the modification of the embodiment. As illustrated in FIG. 6, in the distribution system 1A according to the modification, the viewer terminals 10 are classified into a plurality of groups each corresponding to a distributed network. For example, the viewer terminals 10 are classified according to local regions in which the viewer terminals 10 exist. This configuration ensures that a distribution delay can be substantially uniformized among viewer terminals 10 that belong to the same group.

In the following description, a viewer terminal group (viewer terminal 101-1 to 101-3) connected to a local server 201 will be referred to as first group. A viewer terminal group (viewer terminal 102-1 to 102-3) connected to a local server 202 will be referred to as second group. A viewer terminal group (viewer terminals 103-1 to 103-3) connected to a local server 203 will be referred to as third group. Also in the following description, in a context where it is not necessary to distinguish the viewer terminal 101-1 to 101-3, 102-1 to 102-3, and 103-1 to 103-3 from each other, each viewer terminal will be referred to as viewer terminal 10. In a context where it is not necessary to distinguish the local servers 201 to 203 from each other, each local server will be referred to as local server 20N.

As illustrated in FIG. 6, in the distribution system 1A, the distribution server 20 includes a center server 200 and a plurality of local servers 201 to 203. The center server 200 is communicatively connected to the plurality of local servers 201 to 203. In the local server 201, a group of viewer terminals corresponding to the first group are communicatively connected to each other. In the local server 202, a group of viewer terminals corresponding to the second group are communicatively connected to each other. In the local server 203, a group of viewer terminals corresponding to the third group are communicatively connected to each other.

In the distribution system 1A, the local server 20N is provided in, for example, each local region. To the local server 20N provided in the each local region, the group of viewer terminals corresponding to the each local region are connected.

The viewer terminal 10 receives distribution information from the local server 20N to which the viewer terminal 10 itself is connected. Then, the viewer terminal 10 transmits reaction information to the local server 20N. For example, the viewer terminal 101-1 receives distribution information from the local server 201, and transmits reaction information to the local server 201. The viewer terminal 102-2 receives distribution information from the local server 202, and transmits reaction information to the local server 202.

The local server 20N includes the obtaining circuit 230, the determination circuit 231, and the distribution circuit 233. The obtaining circuit 230 obtains reaction information notified from the viewer terminals 10 connected to the local server 20N. The determination circuit 231 determines whether the reaction information obtained by the obtaining circuit 230 is first reaction information or second reaction information. The determination circuit 231 determines that reaction information determined as second reaction information is to be distributed to the viewer terminals 10 connected to the local server 20N. The distribution circuit 233 transmits reaction information determined as first reaction information to the center server 200.

The center server 200 includes the obtaining circuit 230, the generation circuit 232, and the distribution circuit 233. The obtaining circuit 230 obtains reaction information (reaction information determined as first reaction information) notified from the local server 20N. The generation circuit 232 generates an audience sound using the reaction information notified from the local server 20N. The distribution circuit 233 transmits the audience sound generated by the generation circuit 232 to the local server 20N.

The local server 20N receives, from the center server 200, an audience sound as well as moving images and/or performance sound associated with a live performance. The distribution circuit 233 of the local server 20N transmits the received moving images, performance sound, and audience sound to the viewer terminals 10 connected to the local server 20N. The distribution circuit 233 also transmits, to the viewer terminals 10 connected to the local server 20N, reaction information determined as second reaction information by the determination circuit 231 of the local server 20N.

As has been described hereinbefore, the distribution system 1 according to the above-described embodiment is a distribution system that distributes, in real-time, content to the plurality of viewer terminals 10 (terminal devices). The distribution system 1 includes the obtaining circuit 230, the determination circuit 231, the generation circuit 232, and the distribution circuit 233. The obtaining circuit 230 obtains, from the viewer terminals 10, reaction information indicating the viewers' reactions to the content. The determination circuit 231 determines whether the reaction information is first reaction information or second reaction information. The first reaction information is information for generating an audience sound. The second reaction information is information that is not for generating an audience sound. An audience sound is a sound made by unifying individual viewers' reactions to the content. The generation circuit 232 generates an audience sound based on reaction information determined as first reaction information. The distribution circuit 233 transmits the audience sound to all the viewer terminals 10, and transmits reaction information determined as second reaction information to some of the viewer terminals 10.

Thus, the distribution system 1 according to the embodiment is capable of distributing an audience sound, ensuring that viewers' reactions can be shared in a live distribution. An audience sound is a sound made by unifying individual viewers' reactions to the content. Therefore, by distributing an audience sound, reactions of a crowd of people to a live performance can be distributed, enabling the viewers and performers to have a feeling of being in an actual live performance. Also in the distribution system 1 according to the embodiment, second reaction information can be distributed to some viewers, enabling the some viewers to interact in an intimate manner with each other while listening to the live performance.

Also in the distribution system 1 according to the embodiment, based on a timing at which the reaction information is obtained, the determination circuit 231 determines whether the reaction information is first reaction information or second reaction information. With this configuration, the distribution system 1 according to the embodiment generates an audience sound using a reaction(s) obtained at a predetermined timing, such as a timing at which a response to a call from a performer is obtained. This ensures that in a case where a performer does a particular performance trying to charge up the viewers in a live performance, the viewers' reactions obtained during the particular performance can be made an audience sound. As a result, the viewers and performers are able to have a feeling of being in an actual live performance.

In the distribution system 1A according to the modification of the embodiment, content is distributed using a distributed network. Each local server 20N of the local servers 20N includes the obtaining circuit 230, the determination circuit 231, and the distribution circuit 233. The local server 201 (first local server) transmits content to the viewer terminal 101-1 (first terminal device). The obtaining circuit 230 of the local server 201 (first local server) obtains reaction information from the viewer terminal 101-1. The distribution circuit 233 of the local server 201 transmits, to the center server 200, reaction information determined by the obtaining circuit 230 of the local server 201 as first reaction information. The distribution circuit 233 of the local server 201 also transmits, to the viewer terminals 101-2 and 101-3, reaction information determined by the obtaining circuit 230 of the local server 201 as second reaction information. The viewer terminals 101-2 and 101-3 are terminal device examples to which content is distributed by the first local server. Thus, in the distribution system 1A according to the modification of the embodiment, second reaction information can be distributed within a viewer terminal group connected to a local server through a distributed network. For example, in a case where a local region is linked to a group, a topic unique to the local region can be shared among the viewer terminals that belong to the group.

Also in the distribution system 1A according to the modification of the embodiment, the second reaction information is shared within a viewer terminal-10 group corresponding to a distributed network; for example, shared on a local-region basis. This configuration, however, is not intended in a limiting sense.

Another possible example is a group of viewers who share a hobby or a goal. A reaction of a representative person of the group may be shared among the viewers who belong to the group. For example, upon notification of reaction information from the viewer terminal 10 of the representative person of the group, the distribution server 20 determines the reaction information as second reaction information. The distribution server 20 refers to information such as the viewer information 220 to identify the viewers who belong to the group. Then, the distribution server 20 distributes the representative person's reaction information to the viewers who belong to the group.

A program for implementing the functions of the processing section (the control section 23) illustrated in FIG. 1 may be stored in a computer readable recording medium. The program recorded in the recording medium may be read into a computer system and executed therein. An operation management may be performed in this manner. As used herein, the term "computer system" is intended to encompass hardware such as OS (Operating System) and peripheral equipment.

Also as used herein, the term "computer system" is intended to encompass home-page providing environments (or home-page display environments) insofar as the WWW (World Wide Web) is used.

Also as used herein, the term "computer readable recording medium" is intended to mean: a transportable medium such as a flexible disk, a magneto-optical disk, a ROM (Read Only Memory), a CD-ROM (Compact Disk Read Only Memory); and a storage device such as a hard disk incorporated in a computer system. Also as used herein, the term "computer readable recording medium" is intended to encompass a recording medium that holds a program for a predetermined period of time. An example of such recording medium is a volatile memory inside a server computer system or a client computer system. It will also be understood that the program may implement only some of the above-described functions, or may be combinable with a program(s) recorded in the computer system to implement the above-described functions. It will also be understood that the program may be stored in a predetermined server, and that in response to a demand from another device or apparatus, the program may be distributed (such as by downloading) via a communication line.

While embodiments of the present disclosure have been described in detail by referring to the accompanying drawings, the embodiments described above are not intended as limiting specific configurations of the present disclosure, and various other designs are possible without departing from the scope of the present disclosure.

What is claimed is:

1. A distribution system, comprising:
   an obtaining circuit configured to obtain reaction information from a plurality of terminal devices of a plurality of viewers of content, the reaction information indicating a reaction of each of the plurality of viewers to the content;
   a determination circuit configured to determine whether the reaction information is first reaction information or second reaction information, the first reaction information indicating a first reaction made by equal to or more than a predetermined number of viewers of the plurality of viewers, the second reaction information being different from the first reaction information and indicating a second reaction made by less than the predetermined number of viewers;
   a generation circuit configured to:
     mix, in a case where the reaction information is determined as the first reaction information, a plurality of sound signals corresponding to the reaction information of the plurality of viewers; and
     generate an audience sound based on the mixed plurality of sound signals; and
   a distribution circuit configured to transmit the audience sound generated by the generation circuit to the plurality of terminal devices.

2. The distribution system according to claim 1, wherein the distribution circuit is configured to transmit the second reaction information to at least one terminal device of the plurality of terminal devices.

3. The distribution system according to claim 2, wherein, based on a timing at which the reaction information is obtained, the determination circuit is configured to determine whether the reaction information is the first reaction information or the second reaction information.

4. The distribution system according to claim 3, wherein the determination circuit is further configured to determine the reaction information as the second reaction information in a case where the reaction information includes information regarding a local region.

5. The distribution system according to claim 3, wherein the generation circuit is configured to generate the audience sound by:
   generating the plurality of sound signals based on the reaction information determined as the first reaction information;
   mixing the generated plurality of sound signals; and
   after the mixing, subjecting the mixed plurality of sound signals to acoustic signal processing.

6. The distribution system according to claim 2, wherein the determination circuit is further configured to determine the reaction information as the second reaction information in a case where the reaction information includes information regarding a local region.

7. The distribution system according to claim 6, wherein the generation circuit is configured to generate the audience sound by:
   generating the plurality of sound signals based on the reaction information determined as the first reaction information;
   mixing the generated plurality of sound signals; and
   after the mixing, subjecting the mixed plurality of sound signals to acoustic signal processing.

8. The distribution system according to claim 2, wherein the generation circuit is configured to generate the audience sound by:
   generating the plurality of sound signals based on the reaction information determined as the first reaction information;
   mixing the generated plurality of sound signals; and
   after the mixing, subjecting the mixed plurality of sound signals to acoustic signal processing.

9. The distribution system according to claim 1, wherein the reaction information is determined to be one of the first reaction information or the second reaction information by the determination circuit based on a timing at which the reaction information is obtained.

10. The distribution system according to claim 9, wherein the determination circuit is further configured to determine the reaction information as the second reaction information in a case where the reaction information includes information regarding a local region.

11. The distribution system according to claim 10, wherein the generation circuit is configured to generate the audience sound by:
   generating the plurality of sound signals based on the reaction information determined as the first reaction information;
   mixing the generated plurality of sound signals; and
   after the mixing, subjecting the mixed plurality of sound signals to acoustic signal processing.

12. The distribution system according to claim 9, wherein the generation circuit is configured to generate the audience sound by:
  generating the plurality of sound signals based on the reaction information determined as the first reaction information;
  mixing the generated plurality of sound signals; and
  after the mixing, subjecting the mixed plurality of sound signals to acoustic signal processing.

13. The distribution system according to claim 1, wherein the determination circuit is further configured to determine the reaction information as the second reaction information in a case where the reaction information includes information regarding a local region.

14. The distribution system according to claim 13, wherein the generation circuit is configured to generate the audience sound by:
  generating the plurality of sound signals based on the reaction information determined as the first reaction information;
  mixing the generated plurality of sound signals; and
  after the mixing, subjecting the mixed plurality of sound signals to acoustic signal processing.

15. The distribution system according to claim 1, wherein, for the generation of the audience sound, the generation circuit is further configured to:
  generate the plurality of sound signals based on the reaction information determined as the first reaction information;
  mix the generated plurality of sound signals; and
  after the mixing, subject the mixed plurality of sound signals to acoustic signal processing.

16. The distribution system according to claim 1,
  wherein the content is distributed to the plurality of terminal devices using a distributed network through which the content is transmitted to the plurality of terminal devices via a center server and one of a plurality of local servers connected to the center server,
  wherein each local server of the plurality of local servers includes the obtaining circuit, the determination circuit, and the distribution circuit,
  wherein the plurality of local servers includes a first local server configured to transmit the content to a first terminal device among the plurality of terminal devices,
  wherein the obtaining circuit of the first local server is configured to obtain the reaction information from the first terminal device, and
  wherein the distribution circuit of the first local server is configured to:
    transmit, to the center server, the reaction information determined as the first reaction information by the determination circuit of the first local server; and
    transmit the reaction information determined as the second reaction information by the determination circuit of the first local server to at least one destination terminal device, among the plurality of terminal devices, that is a destination of the content distributed via the first local server.

17. The distribution system according to claim 16,
  wherein the at least one destination terminal device includes a plurality of destination terminal devices, and
  wherein the plurality of destination terminal devices forms a terminal device group such that positions of the plurality of destination terminal devices are included in an identical local region.

18. The distribution system according to claim 1,
  wherein the plurality of viewers belongs to one of a plurality of viewer groups,
  wherein a terminal device group belongs to each of the plurality of viewer groups, and
  wherein in a case where the determination circuit has received the reaction information from a representative terminal device selected from the terminal device group, the determination circuit is configured to determine the received reaction information as the second reaction information.

19. A distribution method performed by a computer used in a distribution system, the distribution method comprising:
  obtaining reaction information from a plurality of terminal devices of a plurality of viewers of content, the reaction information indicating a reaction of each of the plurality of viewers to the content;
  determining whether the reaction information is first reaction information or second reaction information, the first reaction information indicating a first reaction made by equal to or more than a predetermined number of viewers of the plurality of viewers, the second reaction information being different from the first reaction information and indicating a second reaction made by less than the predetermined number of viewers;
  mixing, in a case where the reaction information is determined as the first reaction information, a plurality of sound signals corresponding to the reaction information of the plurality of viewers;
  generating an audience sound based on the mixed plurality of sound signals; and
  transmitting the audience sound to the plurality of terminal devices.

20. A non-transitory computer-readable recording medium storing computer-executable instructions executed by at least one computer used in a distribution system, the computer-executable instructions causing the at least one computer to perform a method comprising:
  obtaining reaction information from a plurality of terminal devices of a plurality of viewers of content, the reaction information indicating a reaction of each of the plurality of viewers to the content;
  determining whether the reaction information is first reaction information or second reaction information, the first reaction information indicating a first reaction made by equal to or more than a predetermined number of viewers of the plurality of viewers, the second reaction information being different from the first reaction information and indicating a second reaction made by less than the predetermined number of viewers;
  mixing, in a case where the reaction information is determined as the first reaction information, a plurality of sound signals corresponding to the reaction information of the plurality of viewers;
  generating an audience sound based on the mixed plurality of sound signals; and
  transmitting the audience sound to the plurality of terminal devices.

* * * * *